United States Patent Office 3,541,589
Patented Nov. 17, 1970

3,541,589
PROCESS FOR PREPARING SILICON NITRIDE COATED REFRACTORY MATERIAL
Eugenio Lubatti and Salvatore Pappalardo, Novara, Italy, assignors to Montecatini Edison S.p.A., Milan, Italy, a corporation of Italy
No Drawing. Filed Nov. 29, 1967, Ser. No. 686,771
Claims priority, application Italy, Nov. 30, 1966, S 30,562/66
Int. Cl. C04b 35/58, 41/32
U.S. Cl. 117—169     3 Claims

ABSTRACT OF THE DISCLOSURE

The invention provides a simple method for producing refractory materials and for coating articles which come into contact with corrosive physical and chemical agents at high temperatures.

The process consists essentially in preparing pastes or paints made up of a mixture of powders having a particle size less than 0.075 mm. consisting of:

65–95% of silicon nitride with a purity higher than 90%;
35–5% boron carbide or other boron compounds (boron nitride, calcium borate etc.); and
optionally 1–25% of substances such as cryolite, glass, zirconium salts, silicon metal and silicon carbide.

The powders are wetted, in the case of pastes, or suspended, in the case of paints, with solutions containing 0.3–0.8% by weight of dispersing agent. The pastes are shaped or articles painted according to conventional techniques. They are then dried and baked in air or in oxidizing atmosphere at temperatures from 850 to 1250° C., and preferably at 1000° C., for 1 to 8 hours, preferably 6 hours.

---

The present invention relates to a process for manufacturing ceramic materials resistant to thermal shock and physical and chemical agents at high temperatures. The invention also relates to paints suitable for coating articles with a highly resistant refractory lining.

Silicon nitride ($Si_3N_4$) is known to be a highly refractory material. It has found important uses in a large variety of fields such as refractory materials in general, electrical technology, nuclear chemistry etc. Among ceramic materials, silicon nitride affords the highest resistance to thermal shock. Thus under certain conditions, its performance is very similar to that of several metals. Silicon nitride also shows good chemical stability. Its dimensional stability and resistance to oxidation are excellent up to temperatures in the order of 1400° C. It is not wetted by common metals. At room temperature it is not attacked by gases containing sulphur and chlorine and resists the attack of most acids. Moreover, it shows high stability toward atmospheric oxygen at high temperatures. This is caused, as in the case of silicon carbide, by the formation of an impermeable surface film of $SiO_2$.

The object of our invention is to provide a simple method for producing refractory materials and for coating articles which come into contact with corrosive physical and chemical agents at high temperatures.

Our process consists essentially in preparing pastes or paints made up of a mixture of powders having a particle size less than 0.075 mm. consisting of:

69–95% of silicon nitride with a purity higher than 90%;
35–5% boron carbide or other boron compounds( boron nitride, calcium borate etc.); and
optionally 1–25% of substances such as cryolite, glass, zirconium salts, silicon metal and silicon carbide.

The powders are wetted, in the case of pastes, or suspended, in the case of paints, with solutions containing 0.3–0.8% by weight of high molecular weight polyacrylamide, such as sold by Dow under the mark Separan, or other dispersing agent. The pastes are shaped or articles painted according to conventional techniques. They are then dried and baked in air or in oxidizing atmosphere at temperatures from 850 to 1250° C., and preferably at 1000° C., for 1 to 8 hours, preferably 6 hours.

The composition of our invention can be used like a paint on insulating refractory articles or refractory materials in general. The refractory materials may contain silicon or aluminum, or both, and may be basic or neutral, provided their surfaces have a coarseness sufficient for the varnish or paint to adhere thereon.

The paint may be applied to the inside of prefabricated chambers of furnaces, to linings of various types, having a coefficient of linear expansion ranging from $2.10^{-6}$ to $8.10^{-6}$ (20°–1000° C.). It may also be applied to pipe-binding coatings based on asbestos tapes and cardboards and/or to any semielastic material.

All the substances of the composition must be finely ground to a particle size less than 0.075 mm.

When the composition is used as a paint, a 0.5% aqueous solution of high molecular weight polyacrylamide such as Separan, or of another dispersing agent, in a range of 0.3 to 0.8%, is added to the composition powder in the proportion of 40 to 70% of solution depending on the fluidity degree desired for the suspension. The whole is then strongly agitated in a mixer, or preferably in a milling jar, so as to obtain a very homogeneous suspension suitable for use as a paint.

This paint may be applied by spraying and/or with a brush and/or by immersion. The layer to be applied may have any thickness within the range of 0.1 to 5 mm. It is not advisable to exceed this value.

For instance, the paint was sprayed in a 3 mm. layer onto a light prefabricated refractory such as Porosal which is manufactured by the Italian firm Sirma and is composed of $SiO_2Al_2O_3$. The painted article was then sufficiently air dried to lose most humidity. Afterwards, the painted article was placed into a drier at 150° C. for a time between 3 and 12 hours, and then in a stove in air and brought to a temperature ranging from 850 to 1250° C., preferably at about 1000° C. The baking time varies from 1 to 8 hours, preferably 6 hours.

The thermal treatment imparts to the manufactured article and especially to the paint such a high degree of hardness that it may be hardly attacked by physical and chemical agents.

The following examples show some embodiments of our invention without limiting the scope thereof.

EXAMPLE 1

Silicon nitride of at least 90% purity and very pure boron carbide were mixed in the proportion of 2700 g. (90%) and 300 g. (10%). The two constituents were ground in a ball mill to a fineness less than 0.075 mm. The powder was then damped with 1800 g. of 0.5% aqueous solution of Separan. The whole was then placed in a stirring mixer for 4 hours.

The varnish thus prepared was then applied onto a light insulating refractory material, such as Porosal, with volumetric weight of 1 kg./dm.³ with total porosity of 55–70%. It was also applied to a manufactured article containing 38% alumina and having 26% apparent porosity and a temporary reversible expansion of +0.75% at 1300° C. The manufactured articles, painted on one or more sides, were left to air dry for 6 hours and then introduced into a drier at 150° C. for 12 hours. Thereafter, the varnished articles were placed into an oven at a temperature gradually rising to 1000° C. and were allowed to stand there for 8 hours.

EXAMPLE 2

10% boron carbide, 10% silicon metal and 10% stabilized zirconium oxide were added to silicon nitride having a purity equal to or higher than 90% and in the proportion of 70% by weight on the total. The components were then placed into a ball mill until a fineness lower than 0.075 mm. was reached.

The remaining procedure corresponds to Example 1.

EXAMPLE 3

10% silicon carbide and 10% boron carbide were added to 80% silicon nitride of at least 90% purity. The remaining procedure corresponds to Example 1.

When it is desired to use the composition directly for the preparation of manufactured articles, one proceeds substantially as above, suitably varying the fluidity of the composition, as required by the shaping technique employed.

EXAMPLE 4

20% boron carbide, 5% metallic silicon and 15% stabilized zirconium oxide were added to silicon nitride of at least 90% purity and in the proportion of 60% by weight on the total. A 0.5% aqueous solution of Separan was added to the powder obtained by operating as described above in proportions of 5 to 15% by weight depending on the plasticity desired in the paste. Other dispersants could have been substituted for Separan.

The paste obtained was then shaped into articles such as crucibles, various containers, boats etc., or extruded to obtain sheaths for thermocouples, pipes, etc. These manufactured articles are placed in air for 6–10 hours and then introduced into a drier at 150° C. for 12 hours.

Finally, baking in an oven was carried out at a temperature ranging from 800 to 1200° C. in air, preferably at 1000° C.

The various percentages used in the specification and claims are by weight.

We claim:

1. A process for coating articles with a refractory lining, which comprises preparing a mixture of powders having a particle size lower than 0.075 mm. made up of:
    (a) 65 to 95% by weight silicon nitride at least 90% pure;
    (b) 35 to 5% by weight of a boron carbide; suspending the mixture of powders in an aqueous solution containing 0.3 to 0.8% by weight of dispersing agent; painting articles with the suspenssion thus obtained; drying and baking the articles in an oxidizing atmosphere at temperatures from 850 to 1250° C. for from 1 to 8 hours.

2. The process of claim 1, wherein the baking temperature is 1000° C. and the baking time is 6 hours.

3. The process of claim 1, wherein the powder mixture consists essentially of:
    (a) 90 to 95% by weight silicon nitride of at least 90% purity and
    (b) 10 to 5% by weight boron carbide.

References Cited
UNITED STATES PATENTS

| | | | |
|---|---|---|---|
| 2,839,413 | 6/1958 | Taylor | 106—55 X |
| 3,035,325 | 5/1962 | Nicholson et al. | |
| 3,199,993 | 8/1965 | Schrewelius | 106—55 |

ALFRED L. LEAVITT, Primary Examiner

C. K. WEIFFENBACH, Assistant Examiner

U.S. Cl. X.R.

106—38.27, 43, 286; 117—123, 127